United States Patent [19]

Schmidt

[11] 4,053,386
[45] Oct. 11, 1977

[54] ELECTROLYTIC FILTER FOR ELECTROLYTICALLY FILTERING AND RECOVERING METALS FROM COLLOIDAL SUSPENSIONS

[75] Inventor: Ferenc J. Schmidt, Ardmore, Pa.

[73] Assignee: Ametek, Inc., New York, N.Y.

[21] Appl. No.: 601,253

[22] Filed: Aug. 4, 1975

Related U.S. Application Data

[63] Continuation-in-part of Ser. No. 515,915, Oct. 18, 1974, Pat. No. 4,014,767.

[51] Int. Cl.$^2$ ............... B03C 5/00; C25C 7/00; C25C 7/04
[52] U.S. Cl. .................. 204/264; 204/152; 204/260; 204/276
[58] Field of Search ............ 204/260, 272, 263, 264, 204/276, 151, 152, 149

[56] References Cited

U.S. PATENT DOCUMENTS

| 387,467 | 8/1888 | Webster, Jr. ............... 204/152 |
| 565,491 | 8/1896 | Meyer ....................... 204/152 |
| 2,546,254 | 3/1951 | Briggs ...................... 204/260 |

FOREIGN PATENT DOCUMENTS

| 338,280 | 11/1914 | Germany |
| 25,222 of | 1907 | United Kingdom |
| 14,248 of | 1908 | United Kingdom |

*Primary Examiner*—T. M. Tufariello
*Attorney, Agent, or Firm*—Miller & Prestia

[57] ABSTRACT

An electrolytic filter, consisting of perforated conductive electrodes isolated by a separator, is adapted to filter at the first electrode or cathode suspended materials, including colloidal metal particles such a silver or gold made colloidal by borohydride, zinc, iron, etc., reduction or sulfide, etc., precipitation of metallic ion-containing solutions. The method of recovery involves use of the electrolytic filter and a composition including the finely divided metal containing waste solution in combination with floc forming compounds such as alkaline earth metal hydroxide, and negative charge imparting additives such as soluble phosphates and anionic resin flocculating agents. Preferably, the filter includes a floc circulating chamber in which the incoming liquid assumes a vertical toroidal flow pattern.

10 Claims, 3 Drawing Figures

ELECTROLYTIC FILTER FOR ELECTROLYTICALLY FILTERING AND RECOVERING METALS FROM COLLOIDAL SUSPENSIONS

This is a continuation-in-part of application Ser. No. 515,915, filed Oct. 18, 1974, now U.S. Pat. No. 4,014,767, of common inventorship and assignment herewith.

This invention pertains to an electrolytic filter and means, method and compositions for using such a filter to recover finely divided or colloidal suspensions of materials such as silver or gold.

That application discloses an electrolytic filter, as described and claimed herein, used in the filtration of digested sewage effluent and also describes the possible application of such a filter for concentrating other colloidal solids or for removing or reclaiming solids from other electrolytic solutions, such as waste sugar or potato processing solutions and refinery wastes. The present application is directed to an improved design of such an electrolytic filter and to novel compositions and methods for use in combination therewith. Such filter, compositions and methods have been found to be particularly effective in recovering colloidal metallic particles from suspensions thereof, particularly such suspensions of silver and gold particles as are produced by reduction of metal ions to metals from waste solutions.

Heretofore, the recovery of a colloidal metal from such treated waste solutions has been accomplished with only limited effectiveness and efficiency, primarily by time consuming and cumbersome settling and/or filtering steps.

The general object of the present invention is to provide a more effective filter for removing or reclaiming such valuable materials and particularly for providing a filter, compositions and methods for reclaiming such materials, and for filtering other charge-bearing colloids or flocs thereof.

This object, and others which will become apparent in the subsequent description of this invention, are met by an electrolytic filter comprising two electrolytic conductive perforated members, electrically insulated from one another and usually separated by a liquid-pervious, gas bubble impervious, electrically non-conductive separator. An electrolytic solution containing the material to be filtered is passed through the first of these conductive members and then sequentially through the separator and the second conductive member while an electrolytic voltage, depending largely on the anode-cathode distance, on the order of 4-30 volts and an electrolytic current, on the order of ½ - 20 amps per square foot electrode area is established between the first conductive member (the cathode) and the second conductive member (the anode). Preferably, the solution enters a chamber through an inlet positioned underneath the negatively charged first perforated member, flows upward towards this perforated member which evolves hydrogen gas bubbles; this gas evolution imparts additional velocity to the solid particles present and establishes a toroidal circulation pattern aiding in the agglomeration and return of the flocculated particles to the bottom of the chamber.

As applied in the recovery of colloidal silver particles from a suspension thereof produced by borohydride-sodium hydroxide ($BH_3$ in sodium hydroxide) treatment, the electrolytic solution consists of the treated waste solution together with floc-forming calcium hydroxide (although other alkaline earth metal hydroxides or iron hydroxide or aluminum hydroxide and indeed other alkaline earth metal or iron salts may be used) and negative charge imparting additives, particularly phosphates such as $NaH_2PO_4$ and an anionic resin flocculating agent, such as Magnifloc 835a, a commercial product of the American Cyanamide Company of Bound Brook, N.J.

This invention may be better understood by reference to the following detailed description thereof, taken in conjunction with the appended claims, and the figures, in which:

Figure 1:
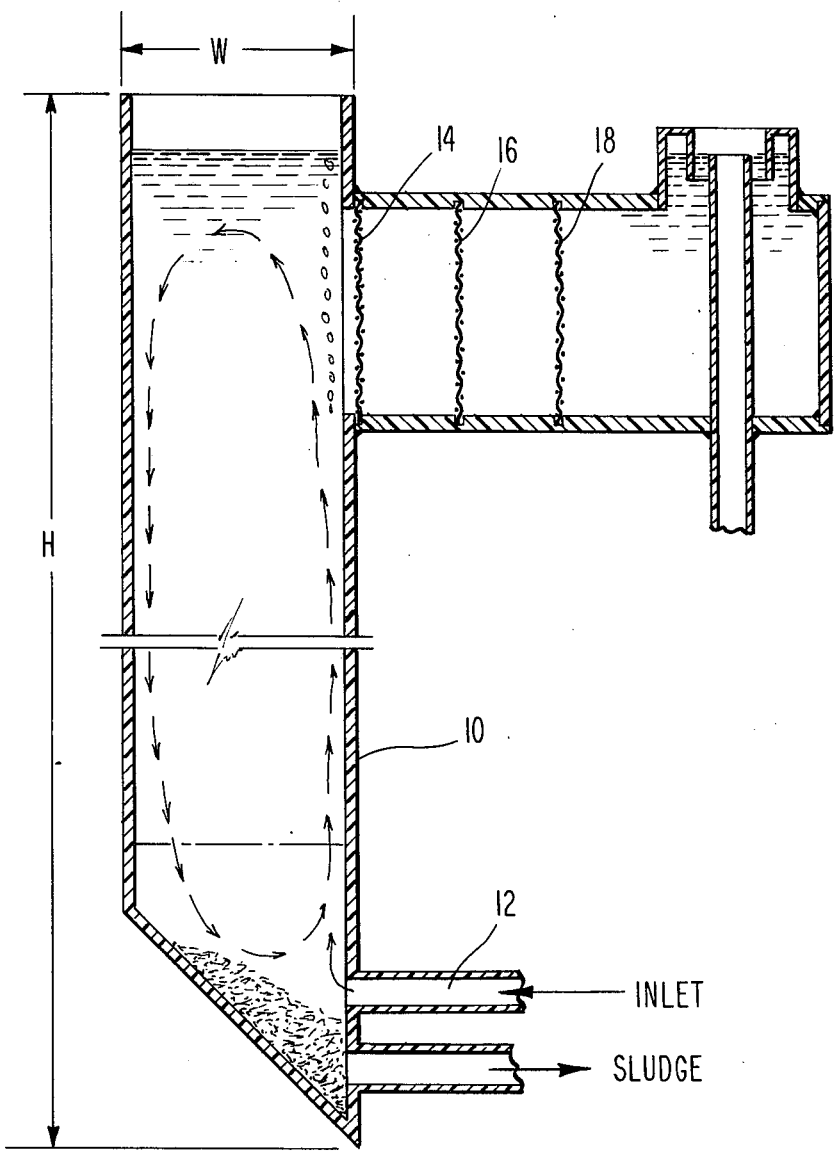
FIG. 1 is a cross-sectional view of a test apparatus used in demonstrating the electrolytic filter of the present invention and the composition and method described herein. (This apparatus uses overly great anode-cathode distance to permit more convenient study of the filtering mechanism.)

Referring more specifically to FIG. 1, there is shown a sloped bottom receiving container 10 with an inlet 12 for introducing an electrolytic solution with suspended material to be removed therefrom and passing it up partially through and above the settling area to a first porous conductive member 14, constituting the cathode of an electrolytic cell, and thence sequentially through a porous, liquid-pervious, gas bubble impervious polypropylene sheet separator 16 and a second porous conductive member 18, constituting the anode of the electrolytic cell of this invention, and preferably consisting of carbon, lead dioxide, magnetite, platinum, ruthenium oxide, or coatings of these materials on supporting substrates, such as titanium or tantalum. The first electrode or cathode may consist of any conductive material not attacked by the alkaline environment, such as steel. The filtration action takes place at or near the cathode, but the openings therein need not necessarily be smaller than the dimensions of the suspended particles to be removed due to the electrolytic action of the filter of this invention.

In the case of one micron or smaller diameter colloidal silver in suspension, the use of 400 mesh metal screens as a nonelectrolytic filter still permits passage of these particles through such filter elements. (In case of slimy sewage, clogging occurs within minutes with such a screen.) In the present invention, the first electrode may have a pore size substantially larger than the particles, on the order of 1/16th of an inch in dimension, which is about 10,000 times the particle size of the colloidal metal particles to be filtered.

In the test cell shown in FIG. 1, the sloped bottom receiving container is approximately 20 inches high, 5¾ inches deep and 3 inches wide (in the dimensions seen in FIG. 1). The electrodes and electrode housing are disposed near the top of the 20-inch height and this circular screen electrode comprises approximately 1/17th of a square foot. In this test cell, electrolytic solution is introduced at a rate of 400 cubic centimeters per minute. With a 10-volt potential across the 2½ inch anode-cathode distance and one amp electrolytic current, effective removal of colloidal silver is obtained. The residual silver content in the effluent is less than twenty parts per billion, well below the maximum level endorsed by environmental authorities. It should be noted that these voltages are substantially below those used in electrostatic filters in which polar repulsion is relied upon to assist in the filtering action. Such electrostatic filters require a higher voltage gradient, generally above 100 volts per centimeter, and no significant current is established, since the fluids used are generally not conductive or only weakly conductive between electrodes. With calcium chloride in the electrolytic solution of this invention, calcium hydroxide forms at the cathode, and chlorine and oxygen are produced at the anode and the solution is self-neutralizing which prevents excessive hydroxyl build-up. Enhanced flocculation of colloids and growth of floc size is produced at the cathode by localized high hydroxyl concentrations and by the toroidal flow pattern established due to the electrolytic action.

In the preferred embodiment of the electrolytic solution of the present invention, particularly for the removal of colloidal silver from silver ion-containing waste waters, the electrolytic solution comprises the colloidal metal suspension which is derived from an aqueous solution of silver ions through reduction by a borohydride-sodium hydroxide reducer, and alkaline earth metal hydroxide solution flocculating agent which adsorbs the colloidal silver particles, and additional negative charge imparting flocculating agent, such as anionic resin flocculating agent.

Generally, the borohydride comprises about 1.5 to 5 times the stoichiometric amount required to reduce the metallic ion to be recovered and the remainder of the solution comprises, per liter of solution from which the metal is to be recovered, 5–30 (preferably about 15) ml 1N sodium hydroxide, 0.1–5.0 (preferably about ⅔) gram calcium chloride which converts to calcium hydroxide in solution, 0.1–2.0 (preferably about ½)gram $NaH_2PO_4$ and 0.1–2.0 (preferably about ½) gram of anionic resin flocculating agent.

Figures 2, 3:
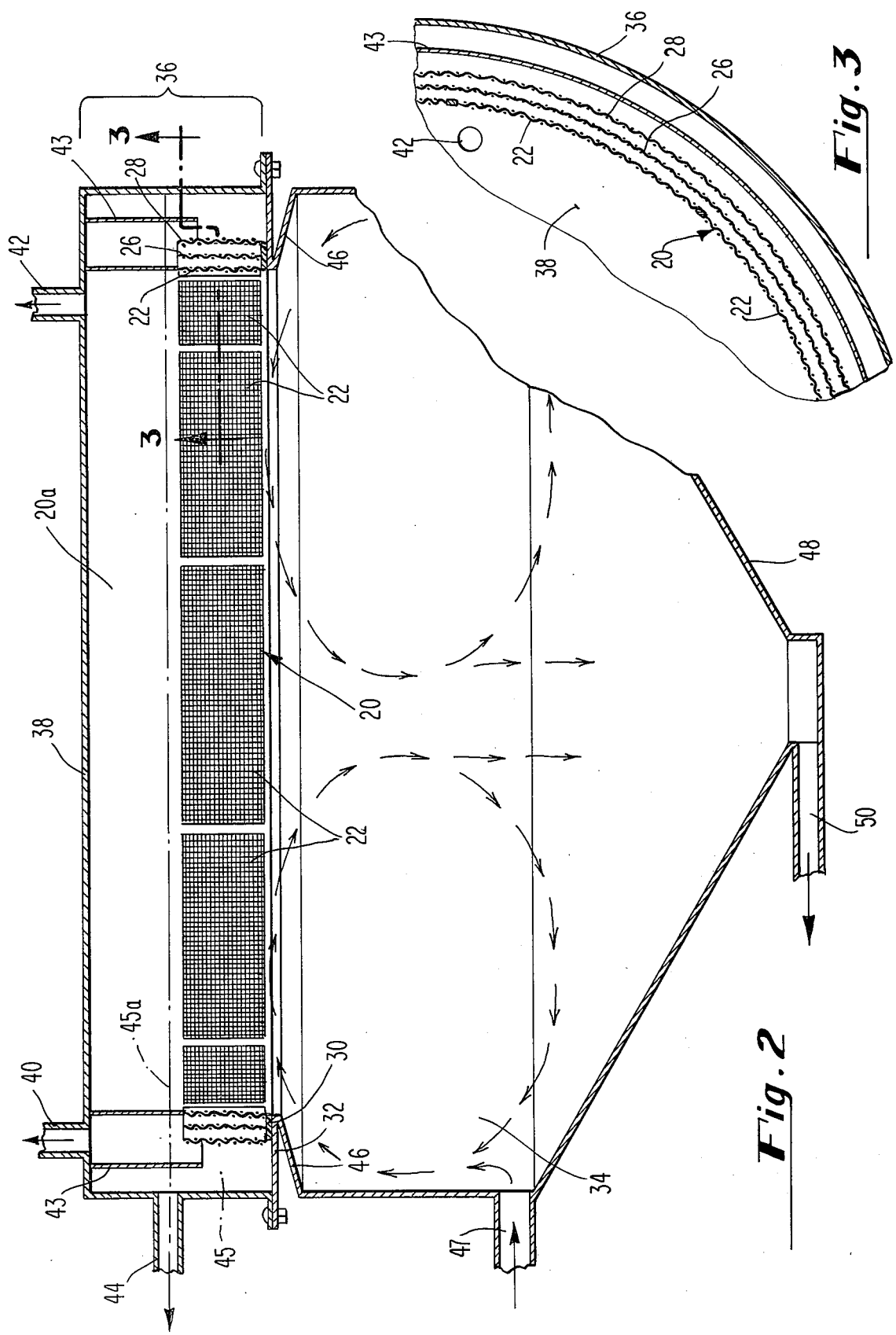
FIG. 2 is a schematic view of the assembled electrode-separator assembly and container therefor, in accordance with the preferred embodiment of the present invention.
FIG. 3 is a top view of the electrode-separator assembly of the electrolytic filter of the present invention in the preferred form thereof (with an anode-cathode distance of 1 inch or less).

Turning now to FIGS. 2 and 3, in which is shown the preferred embodiment of the electrolytic filter of the present invention, there is seen an inner annular ring or cylinder of stainless steel sheet 20 with stainless steel screen windows 22. Gas bubble impervious, liquid pervious separator, comprised of porous polyethylene sheet 26 is disposed just outward of cathode screen 20 and outward of separator 26 is anode screen 28, which in the most preferred embodiment of the present invention consists of platinum or platinum group metal oxide-coated titanium. An upper section 20a of cathode 20 prevents the combination of oxygen, chlorine and hydrogen gases evolved at the two electrodes from recombining, possibly in an explosive manner. (This could also be prevented by blowing air or some other gas across the top of the electrolyte to dilute the evolving gases below their explosive concentrations.) Cathode 20 and anode screen 28 are separated by an insulated mounting block 30.

Cathode 20, separator 26, anode screen 28 and separator 30 together comprise the electrode assembly which rests on shield 32 in filter container 34, seen in FIG. 2. A top section 36 of electrolytic filter container 34 includes a top cover 38 with vents 40 and 42 disposed generally over electrodes 20 and 28 on either side of upper cathode section 20a. Top section 36 also includes a downwardly extending baffle or weir 43 of non-conductive material preventing foam on the gas evolving surface 45a of electrolytic solution 45 from passing through outlet 44. Outlet 44 is provided for the removal of filtrate, after it has been introduced through inlet 47 and passed through the electrolytic filter screen elements in container 34. Container 34 also includes frustoconic baffle 46 which aids in the establishment of the toroidal circulation pattern and prevents the build-up of gases below shelf 32. At the bottom of container 34 is a conical solids collecting section 48 and sludge outlet 50. Electrolytic solution containing the suspended material to be filtered is introduced to container 34 through inlet 47 where it rises towards the hydrogen evolving screen 20 where the solids experience an increase in velocity and assume the toroidal circulation pattern shown by arrows in FIG. 2. The clear liquid or filtrate passes through cathode 20 and into the center section of the electrode assembly, then through anode 28 and out through outlet 44. Recovery of the toroidally circulating solids is enhanced by the adhesion of the circulating flocs to the sludge already collected in the frustoconic settling area and by the horizontal zone of abrupt pH increase below the cathode 20 caused by diffusion of hydroxide ions from the cathode in the counter-current direction. Container 34, particularly top section 36 provides, above outlet 44, a gas collection space in communication with vents 40 and 42 to prevent any dangerous build-up of gases produced by electrolytic action in the filter.

Such gas collection spaces, vents, electrode separators and gas separators as are described with respect to the filter as shown in FIGS. 2 and 3 may be omitted if sufficient air or other inert gas is circulated at or near the space into which the electrolytically produced gases evolve in order to dilute these gases below their explosive concentrations.

It should also be noted that the perforated metal cathode 20 of this invention serves as a non-electrolytic filter for larger particles, thus acting as a fail safe filter mechanism, as required by certain state regulations, in the event of failure of the electrolytic filtering action of the filter of this invention.

In an electrolytic filter of the type shown in FIGS. 2 and 3, with a container diameter of 38 inches and a cathode or inner electrode diameter of 32 inches and with an electrode height of 3 inches and a solids circulating height, above conical solids collection bottom section, of 10 inches, a through-put of colloidal silver particle-containing solution, of composition as described above, on the order of 2–5 gallons per minute was obtained. From tests in the FIG. 1 test cell it has been shown that a through-put of 2 gallons per square foot of electrode area per minute is easily attainable. It should be observed that while the technical phenomenon on which the electrolytic filter of this invention is based is not completely understood, it is quite clearly not merely an electrostatic effect which contributes to the filtering action of this invention. The linear flow rate of filtration through the filter is more than 30 times the velocity of charged particles which could be expected due to electrostatic effects and also is more than three times the settling velocity of the suspended material.

It is apparent then that some explained electrolytic effect, or a combination of several known phenomena effects are contributing to the effectiveness of the filter of this invention. By way of comparison, while deep bed filters generally handle a through-put of ½ gallon per square foot of filter area, the electrolytic filter of this invention has shown itself to be capable of handling a through-put of over 2 gallons per square foot of filter area per minute.

As indicated above, the technical phenomenon upon which this electrolytic filter action is based is not completely understood. It may be partially explained on the basis of localized high pH in the immediate vicinity of the cathode which "shocks out" the colloidal suspended metal particles. This may also be reinforced by the mechanical effect of bubbles produced in the first electrode, where the filtering action is governed, which tends to close down the effective pore size, the bubbles functioning themselves as a mechanical filter. Thus, evolving gas bubbles clinging to the filter screen openings may act as a fine mesh screen which is not subject to clogging, as ordinary fine mesh screens are. It is clear that the evolving gas bubbles do knock off filter cake, as it accumulates during operation without simultaneous flow of electric current, and prevent clogging.

The vertical toroidal circulating action, caused by cell geometry and by the velocity imparting action of the gas bubbles have a demonstrably strong effect on the filtering action. Thus when the cell geometry prevented the establishment of the toroidal circulating pattern—while the electrolytic conditions remained the same —the filtering action deteriorated at flowrates in excess of ½ gallon per square foot per minute. The gas bubbles rise at a velocity of approximately 4 inches per second, visibly accelerating the solids parallel to the filter screen. Furthermore, localized heating at the cathode surface, due to passage of current, likely causes the formation of toroids within the general toroidal flow pattern, thus aiding the growth of flocs.

The hydroxyl ions generated in the cathode make the vicinity of the cathode much more strongly alkaline than the bulk of the solution. These ions diffuse quite rapidly, at a rate of about 2.5 – 3 centimeters per minute. The form a horizontal layer just below the vertical screen. Much of the flocculation of floc growth occurs in this layer and the calcium chloride in the silver recovery process described above flocculates as calcium hydroxide at this interface. An additional benefit is obtained therefore in that calcium build-up on the screen, as is a problem in other processes, is avoided. Additives and pH in the present system also contribute to the formation and growth of flocs. This growth of floc can be visually observed. The growth and settling of flocs may be aided by the particle discharge of the polar particles at the cathode which makes the settling rate much higher than would be otherwise predictable from Stokes' Law. The additives in the electrolytic solution in the present invention render the suspended particles negatively charged which may contribute to the electrolytic filtering action and electrostatic effect.

Large particles are of course subject to mechanical filtration in the screen electrode elements and the evolution of chlorine or oxygen at the anode in certain filtrates, such as sewage effluent, is effective in disinfecting the effluent and destruction of wetting agents found in some silver containing solutions or photographic fixers. However, sulfate ion may be used to render the solution conductive if the evolution of chlorine is undesirable.

The filtration of sewage effluent, as described in the above-referenced parent of the present application, and the reclamation of colloidal metallic ions from waste solutions, particularly borohydride treated silver ion containing waste solutions, are two particularly useful applications of the present invention. Other colloidal metal solutions, such as may be produced by reduction with other chemicals or precipitation with sulfides, etc., may also be treated in accordance with this invention.

Detergent, clays, bauxite, and gold and phosphate ores have also been successfully filtered by the above-described method and apparatus. In the case of clays and bauxite, additional calcium ion, through the addition of calcium chloride, and phosphates were not required. Rather, only the flocculating agents such as the anionic resin flocculating agent described above, or starch was sufficient. This is attributed to the fact that clays, like sewage, already carry a natural negative charge. In the above referenced sewage filtration process, the sewage colloids carry sufficient negative charges to eliminate the necessity of any additional agents, including flocculating agents. Other negatively-charged colloidal particles are expected to be similarly filterable. Other non-charged or neutral particles, such as the metallic ions described above, must be occluded in some floc, such as a calcium hydroxide floc described above, and in order effectively to be charged negative charge-inducing ions have to be added in order to facilitate their filtration as described herein.

It should also be noted that in the electrolytic filter compositions of this invention, the use of calcium chloride together with soluble phosphates results in the precipitation of calcium phosphate. When this material combines with filtered and collected metal, it acts as a flux in the subsequent smelting of the filtered metal to recover metal values. Extraneous phosphates also precipitate together with the calcium; furthermore, ammonia is driven off in the high pH cathodic environment. Thereby two obnoxious pollutants which heavily contribute to growth of algae and atrophication of waters, are eliminated from the effluent when the filter of this invention is used for the recovery of silver from photo-processing effluents. Moreover, the typical biological oxygen demand of such effluents, generally on the order 100–300 parts per million, is sharply reduced or eliminated in the anodic compartment of this cell, as described in the above referenced parent of this application due to anodic oxidation and evolution of chlorine and/or oxygen. Cyanides are destroyed in the same manner.

While this invention has been described with respect to specific embodiments and examples, it should be understood that this invention is not limited to these embodiments. The appended claims are intended to be construed to encompass all forms of the invention, including variations and modifications which may be made by those skilled in the art without departing from its true spirit and scope.

I claim:

1. An electrolytic filter comprising two electrically conductive vertically disposed sheet porous members, means adapted to cause an electrolytic fluid carrying suspended solids to be separated therefrom, to pass through a first one of said conductive members from an inlet side to an outlet side thereof where the removal of solids is completed on the inlet side thereof, and then through a second one of said conductive members, and means adapted to establish an electrolytic current between said first member, as cathode, and said second member, as anode, through said electrolytic fluid flowing therebetween, said filter adapted to accomplish said removal by the formation of flocs in the space adjacent said cathode on the inlet side thereof and to facilitate the removal and collection of said flocs by upward fluid flow parallel to said cathode adjacent its inlet side induced at least in part by electrolytically generated gas thereat.

2. An electrolytic filter, as recited in claim 1, including fluid inlet and outlet means and solids settling space adapted to produce a vertical toroidal circulation fluid flow pattern of the incoming fluid past said first conductive member.

3. An electrolytic filter, as recited in claim 2, further including gas bubble impervious, electrically non-conductive separator means interposed between said first and second conductive members.

4. An electrolytic filter, as recited in claim 3, wherein said first conductive member, said separator and said second conductive member comprise cylindrical shapes of progressively larger diameter and are concentrically arranged within a cylindrical container with a conical bottom for collection of settled solids, said separator, said conductive members, said container and said bottom all having a common vertical axis.

5. An electrolytic filter, as recited in claim 4, including means for imposing a potential of 4–30 volts and a current of ½ to 20 amps per square foot of electrode area betwen said conductive members.

6. An electrolytic filter, as recited in claim 5, wherein said anode consists of carbon, lead dioxide, magnetite, platinum, platinum group metal oxide, or coatings of these materials on supporting substrates.

7. An electrolytic filter, as recited in claim 6, wherein said anode is platinum or platinum group metal oxide-coated titanium.

8. An electrolytic filter, as recited in claim 5, wherein said cylindrical container is substantially higher than the height of said cylindrical, concentric cathode and anode and includes gas collection space and vents above the liquid level in said container and solids settling space below said concentric cathode and anode.

9. An electrolytic filter, as recited in claim 1, further including means for passing a gas over said electrodes in sufficient quantity to dilute gases evolved thereat to prevent forming explosive combinations thereof.

10. An electrolytic filter for a waste treatment system through which electrolytic fluid is adapted to flow comprising:
a container having fluid inlet means and outlet means near the bottom of said container,
a porous cathode member mounted in said container, said cathode member being positioned in said container so as to form a first filter and spaced from said inlet means to produce a vertical toroidal circulation fluid flow pattern,
a porous anode member in said container spaced from said cathode member and forming a second filter,
gas bubble impervious, electrically non-conductive separation means interposed between said anode and said cathode, and
means adapted to establish an electrolytic current between said anode and said cathode through said electrolytic fluid, whereby fluid entering said containers contacts said cathode so as to cause an evolution of hydrogen gas bubbles and imparts an additional velocity to the vertical toroidal circulation fluid flow.

* * * * *